United States Patent [19]

Harrison

[11] Patent Number: 5,024,527

[45] Date of Patent: Jun. 18, 1991

[54] METHOD AND APPARATUS FOR REMOTE POSITION SENSING USING EDGE DIFFRACTION

[75] Inventor: Andrew B. Harrison, Stevenage, United Kingdom

[73] Assignee: British Aerospace Public Limited Company, London, England

[21] Appl. No.: 331,337

[22] Filed: Mar. 31, 1989

Related U.S. Application Data

[63] Continuation-in-part of Ser. No. 13,782, Feb. 12, 1987, abandoned.

[30] Foreign Application Priority Data

Feb. 12, 1986 [GB] United Kingdom ............... 8603391

[51] Int. Cl.$^5$ .................................................. G01B 11/00
[52] U.S. Cl. ................................... 356/124; 356/375; 82/1.11; 82/12
[58] Field of Search ............... 356/124, 373, 375, 400; 250/561; 82/1.11, 12

[56] References Cited

U.S. PATENT DOCUMENTS

| | | | |
|---|---|---|---|
| 1,803,429 | 5/1931 | Gunning | 82/12 |
| 2,629,936 | 3/1953 | Cronstedt | 82/1 C |
| 2,990,664 | 7/1961 | Cepero | 51/284 |
| 3,221,577 | 12/1965 | Baum | 82/12 |
| 3,361,030 | 1/1968 | Goldberg . | |
| 3,468,610 | 9/1969 | Muffoletto . | |
| 3,662,040 | 5/1972 | Urbach et al. | 264/1 |
| 3,738,204 | 6/1973 | Spriggs | 82/12 |
| 3,772,832 | 11/1973 | Smith | 51/284 |
| 3,797,939 | 3/1974 | Pryor . | |
| 3,822,096 | 7/1974 | Wilms et al. | 356/124 |
| 3,835,588 | 9/1974 | Whitham | 51/58 |
| 3,873,206 | 3/1975 | Wilcock . | |
| 3,883,249 | 5/1975 | Pryor . | |
| 3,907,439 | 9/1975 | Zanoni | 356/375 |
| 4,084,458 | 4/1978 | Galley | 82/12 |
| 4,313,355 | 2/1982 | Becker et al. | 82/1 C |
| 4,375,739 | 3/1983 | Machida et al. | 51/58 |
| 4,455,901 | 6/1984 | Council | 82/12 |

FOREIGN PATENT DOCUMENTS

| | | |
|---|---|---|
| 1125050 | 6/1982 | Canada . |
| WO88/00506 | 1/1988 | European Pat. Off. . |
| 47-51270 | 12/1972 | Japan . |
| W088/00506 | 1/1988 | PCT Int'l Appl. . |
| 396390 | 8/1933 | United Kingdom . |
| 2151774 | 7/1985 | United Kingdom ............... 356/400 |

*Primary Examiner*—F. L. Evans
*Attorney, Agent, or Firm*—Cushman, Darby & Cushman

[57] ABSTRACT

Contact lenses can be made by machining an inner concave surface into a plastics material blank, then mounting the blank in a lathe and machining the outer convex surface thereon. Repeated measurement with a micrometer is needed during the latter machining to ensure that the lens vertex is correctly formed. To avoid this, the sensor described herein comprises a remote laser source from which radiaiton passes the lens vertex in the blank to a detector, the items being arranged so that, when the lens has been correctly machined, a surface diffraction effect occurs at the vertex leading to a detectable signal from the detector. The basis of the technique is the projection of an image of an edge diffraction intensity distribution through a slit to the detector while the non-diffracted component of the laser beam is prevented from reaching the detector. The high intensity laser diffraction edge pattern generates a narrow symmetric output signal from the detector as the edge traverses the slit, thereby enabling test piece positions to be located along the translation axis. The disclosed sensor apparatus may use the same technique during manufacture of items other than contact lenses and may be used for diamond tool profile measurements, for example.

56 Claims, 9 Drawing Sheets

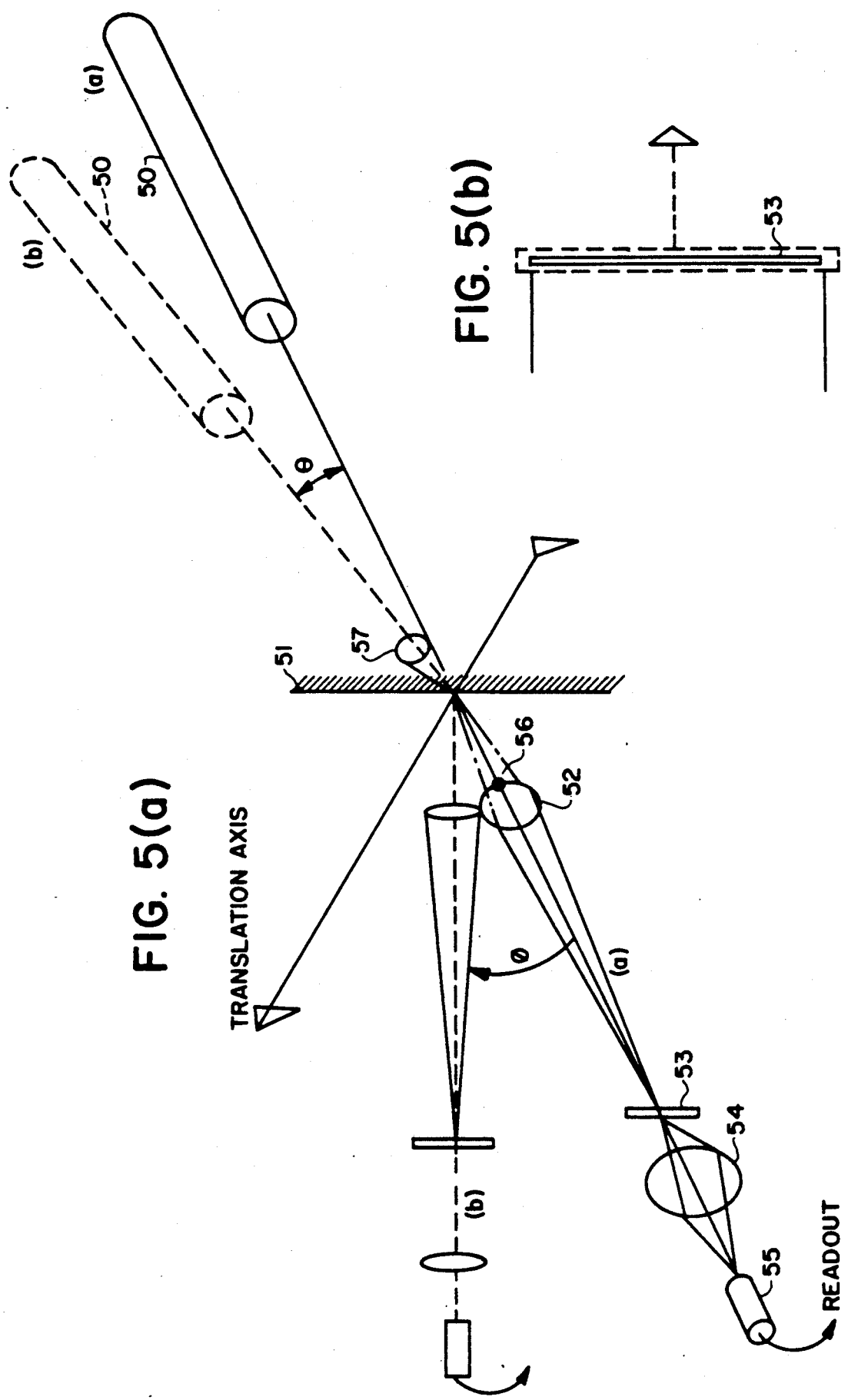

METHOD AND APPARATUS FOR REMOTE POSITION SENSING USING EDGE DIFFRACTION

CROSS-REFERENCE TO RELATED APPLICATIONS

This application is a continuation-in-part of copending application Ser. No. 07/013,782 filed Feb. 12, 1987 by the present inventor, now abandoned.

BACKGROUND OF THE INVENTION

This invention relates to the application of laser light properties to a diffraction edge remote position sensor for detecting the position of a surface or interface, and in particular, but not exclusively, to such a sensor for determining the position of the vertex of a partially fabricated contact lens during the manufacture thereof.

In one known method of manufacture of contact lenses, for example, that disclosed in U.S. Pat. No. 4,455,901, a cylindrical blank of plastics material is machined on a lathe to form the inner concave surface of the lens to be produced. Manufacture of the lens is completed by attaching the machined concave surface to a domed metal arbour by means of wax or other suitable meltable material, mounting the metal arbour in the chuck of the lathe and machining the exposed material to form a convex surface defining the outer surface of the lens and then removing the lens from the arbour.

It will be appreciated that, in order to ensure that the lens is neither too thick nor too thin, it is necessary to be able to determine the vertex position—that is, the point of intersection of the axis of symmetry of the lens with the inner surface—with a high degree of accuracy. If the lens is too thick or too thin it will need to be scrapped because it will not perform to its optical design specifications. At present, the position of the vertex of the lens is determined by using a micrometer to measure the distance between the vertex of the concave surface and the plain end of the blank, and then marking this dimension on the arbour. Knowing this dimension, the blank is machined to form the concave surface defining the outer surface of the lens at a distance to provide a lens of the required thickness. This process is, however, time consuming and does not provide sufficient accuracy for production of thin lenses. In the particular manufacturing technique studied, it was necessary to be able to determine the position of the vertex with an accuracy in the region of ±10.0 microns.

A need therefore exists for a sensor capable of determining the vertex position of the formed surface of a partially fabricated contact lens with sufficient accuracy to enable the other surface to be formed to produce a contact lens having an acceptable thickness. Diffraction phenomena generated by laser sources have previously been used for demonstrations of the wave nature of light. Such applications of diffraction have been mostly limited to image processing via spatial filtering and have not been previously used for determining the vertex position of a partially fabricated contact lens to within the required accuracy. However, in the parent application, the present inventor recognized that the properties of laser sources, namely, the high beam intensity and sub-millimeter beam diameter, are ideally suited for application to edge and position sensing. The present invention relates to further enhancements of the method therein disclosed.

SUMMARY OF THE INVENTION

According to one aspect of this invention, there is provided an apparatus for detecting the presence of a surface or interface of an object at a predetermined position within a sensing region with respect to the apparatus, the apparatus comprising:

illuminating means for directing radiation along a sensing axis through the sensing region; and radiation detector means for detecting radiation from the illuminating means which has been deviated by the surface or interface of the object, the radiation detector means being disposed such that radiation which is not deviated by the surface or interface does not reach the radiation detector means, whereby the presence of the surface or interface of the object may be determined from the radiation detected by the radiation detector means.

By this arrangement, when the surface or interface is in a predetermined position within the sensing region, the beam of radiation is caused to be deflected by a surface diffraction effect, thus altering the intensity of the radiation detected by the optical radiation detector means. The inventor has observed that as a surface is moved through the sensing region in a direction transverse to the sensing axis a curve representing intensity versus axial position reaches a sharply defined, symmetric peak at a unique position which is thought to be caused by surface diffraction effects akin to those which give rise to the sunburst phenomenon observed at dusk or dawn. It will be appreciated that the sharpness of the peak allows data position to be defined with a high degree of accuracy, and since the peak is symmetrical, its exact location may be determined by taking the mean position of two equal intensity points, one on either side of the peak.

Preferably, the illuminating means includes a laser source and the optical radiation detector means comprises an objective lens adapted to form an image of the sensing region at an image plane and an eyepiece adapted to focus the image onto a detector element. In this arrangement, a slit may advantageously be provided at the image plane to select a predetermined portion of the sensing region for examination.

The present invention relates to a further development of the above technique whereby under optimum conditions positions can be located to $<\pm 1$ μm at 30 mm; $<\pm 5$ μm at 3 meters and $<\pm 10$ μm at 8 meters. A closed loop system also promises a further significant increase in resolution and a means of obtaining high resolution profile measurements. However, the technique herein disclosed is not limited to test pieces of any particular range of refractive indices such as contact lenses and may be used for other objects having flat surfaces to curvatures $<<1$ mm radius.

As in the parent application, the basis of the technique is the projection of an image of an edge diffraction intensity distribution through a slit to a detector while the non-diffracted component of the beam is prevented from reaching the detector. The high intensity laser diffraction edge pattern generates a narrow symmetric output signal from the detector as the edge transverses a slit which enables test piece positions to be located along the translation axis. The present invention relates to particular configurations whereby the above technique is performed with or without a beam stop or some other device for preventing the non-deflected beam which has travelled through the sensing region from reaching the radiation detector.

BRIEF DESCRIPTION OF THE DRAWINGS

By way of example only, several specific embodiments of this invention will now be described in detail, reference being made to the accompanying drawings, in which:

FIG. 3 is a view showing the view through the microscope of FIG. 1;

FIG. 5 is a schematic view of a third embodiment of the position sensor showing an optimum configuration (b) where a beam stop or knife edge are not necessary;

DETAILED DESCRIPTION OF THE PREFERRED EMBODIMENTS

By way of example only, the position sensors illustrated in the Figures are designed to be attached to the tool slide of a computer controlled contact lens lathe to allow the vertex position of the concave inner surface of a contact lens to be determined with sufficient accuracy to enable a lens of the correct thickness to be produced. A lathe of this type is of conventional construction, including a chuck for holding a workpiece and a toolslide carrying a tool for machining a workpiece held in the chuck. In the manufacture of contact lenses, a cylinder blank of plastics material is initially machined to provide the inner concave surface of the lens. The concave surface of the lens is then attached to the convex surface of a brass holder known as an arbour using a meltable wax adhesive, and the remainder of the blank is machined to provide the convex outer surface. The machined lens is then removed from the arbour.

The sensors illustrated in the Figures are designed to provide to the computer controlling the lathe a data signal representative of the vertex position of the concave inner surface so that the computer may determine the appropriate path for the tool 10a to follow when machining the lens to ensure that the finished lens is of the correct thickness.

Figure 1:
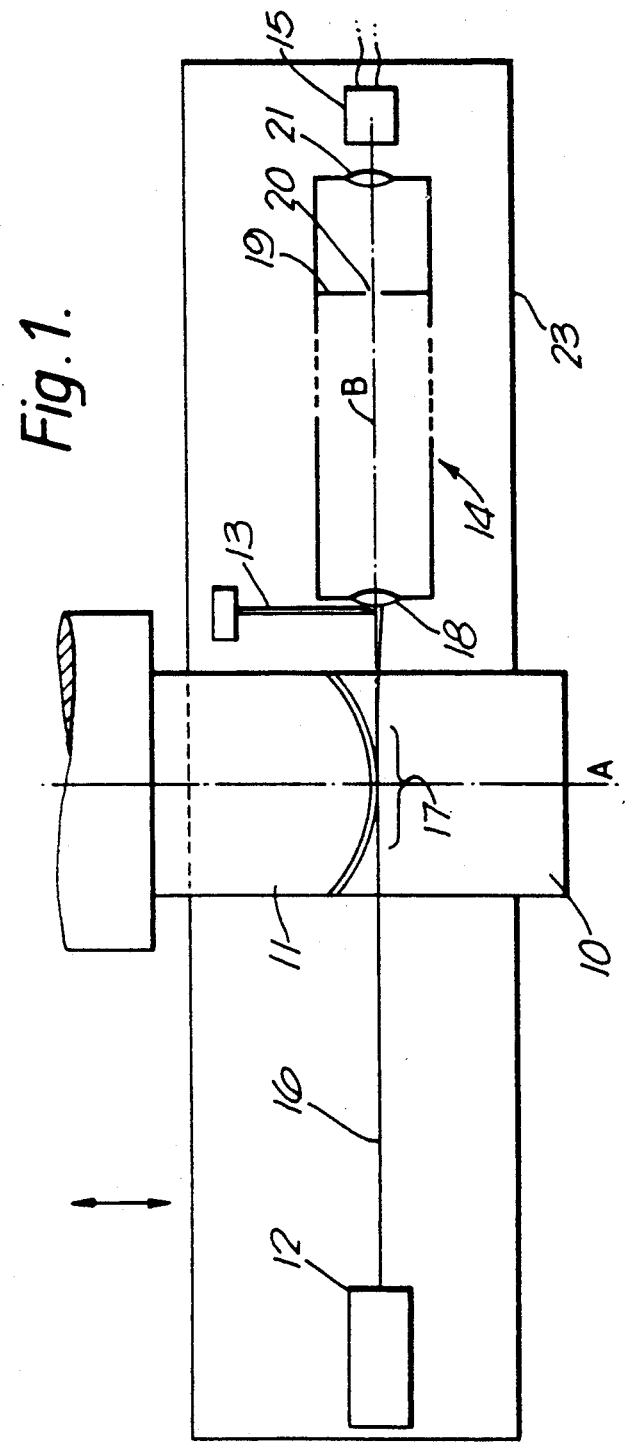
FIG. 1 is a schematic view from above of part of a contact lens lathe, illustrating a first embodiment of a position sensor.

In FIG. 1, a partially formed contact lens blank 10 is shown attached to the convex end surface of a brass arbour 11. The contact lens blank 10 is of transparent plastics material. The other end of the arbour 11 is gripped by the chuck (not shown) of a lathe (not shown) for rotation about axis 'A'.

The position sensor comprises a Helium-Neon (He—Ne) Laser 12, a knife edge 13, a microscope 14 and a photodiode 15 all secured to the tool slide 23 of the lathe. The tool slide is movable backwards and forwards parallel to axis 'A'.

The laser 12 emits a collimated beam 16, typically 2 mm wide, along a sensing axis B which lies perpendicular to axis A and intersects it within a sensing region 17. The microscope 14 is aligned with sensing axis B and includes an ×5 objective lens system 18 for producing an image of the intersection of axes 'A' and 'B' at an image plane 19. A slit 20 is also located at the image plane to select only a slot region extending in a direction orthogonal to axes A and B. The image at slit 20 is then passed on to the photodiode 15 by means of an ×10 eyepiece system 21 of the microscope.

Adjacent the outer lens of the objective lens system 18 is located the knife edge 13 which extends orthogonal to axes 'A' and 'B' and which is positioned so that it protrudes into the beam 16 just sufficiently to prevent it from reaching the microscope when there is nothing in sensing region 17 to cause the beam to deviate.

Figure 2:
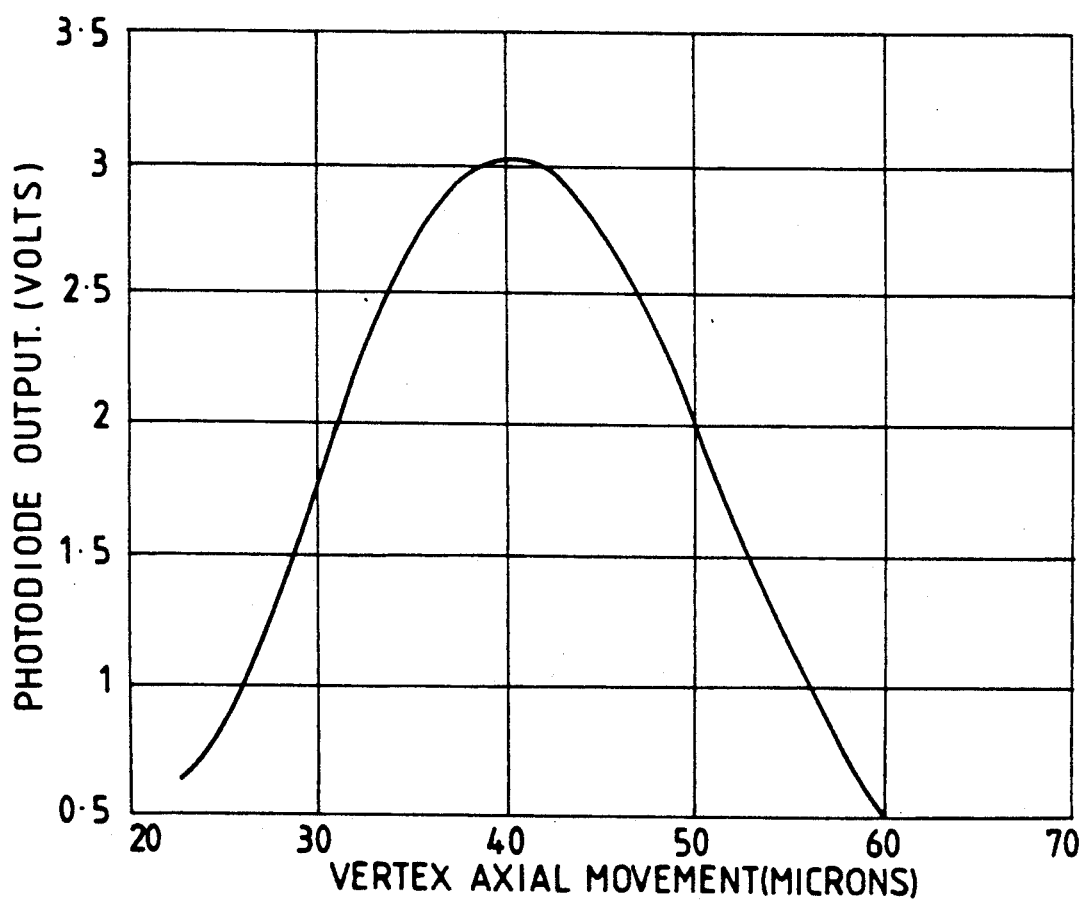
FIG. 2 is a graph plotting intensity against axial position for the arrangement of FIG. 1.

In use, the tool slide is moved towards the arbour in the direction of axis 'A' while the output of the photodiode 15 is monitored to record the intensity of this incident radiation. When there is no material in the sensing region, the incident radiation is at a low background level because it is almost wholly obscured by the knife edge 13. When, however, the outer end region of the blank 10 is adjacent or coincident with the beam 16, a surface diffraction effect causes the beam to deviate sufficiently to cause an increase in intensity of the radiation incident upon photodiode 15, and consequently its output rises to indicate the presence of the surface. Continued movement of the tool slide towards the chuck causes the laser beam 16 to impinge on the blank 10 intermediate its ends so that no surface effects are apparent. Thus, there is no deviation of the beam 16, and the intensity of this radiation incident upon the photodetector is therefore relatively low. When, however, the beam 16 approaches the convex interface with the concave surface of the lens blank 10 and the wax adhering the blank to the arbour 11 approaches the beam 16, the variation of intensity incident on photodiode 15 with its axial position is as shown in FIG. 2. Referring to this figure, it will be noted that the intensity reaches a sharply-defined symmetric peak. By monitoring the output of the photodiode 15, the presence of the interface, and thus the position of the vertex of the concave surface of the blank can be determined precisely. In tests carried out, it was found that the position of the vertex could be determined to an accuracy of within ±3 microns using a laser beam of width 2 mm.

The output from the photodiode 15 may be monitored by supplying it to a meter (not shown) and then adjusting the position of the arbour to obtain maximum intensity and then reading off or marking the longitudinal position of the tool slide with respect to the lathe bed. Alternatively, the position may be determined by recording the longitudinal position of the tool slide in relation to the intensity detected by the photodiode as the tool slide is moved towards the arbour. In this case, the data position may be determined as before by sensing the position of maximum sensed intensity or by noting the position of two equal intensity points on either side of the maximum and then calculating the mid-point which will correspond to the position of the maximum.

The technique described above allows a sharply defined data point to be fixed with respect to the lathe bed which corresponds to the axial position of the vertex of the concave surface of the partially formed lens blank 10. The lathe can then be calibrated to enable lenses of a particular thickness to be manufactured without the need manually to measure the axial length of the partially formed blank. Calibration may be effected by cutting the outer concave surface of a lens with the tool slide in approximately the correct longitudinal position, measuring the actual thickness of the lens produced and calculating the offset (if any) required to produce a lens of the required thickness.

FIG. 3 shows the view seen by the photodiode with the slit removed; the position of the edges of the slit are shown in dotted lines. The Figure illustrates the position of the blank 10 and arbour 11 viewed by the microscope when the tool slide is at the data position. A surface diffraction effect causes a large part of the concave interface to glisten. The slit 20 selects only that part of the image which is influenced by the presence of the interface. This enables the signal to noise ratio of the device to be relatively high.

Figure 4:
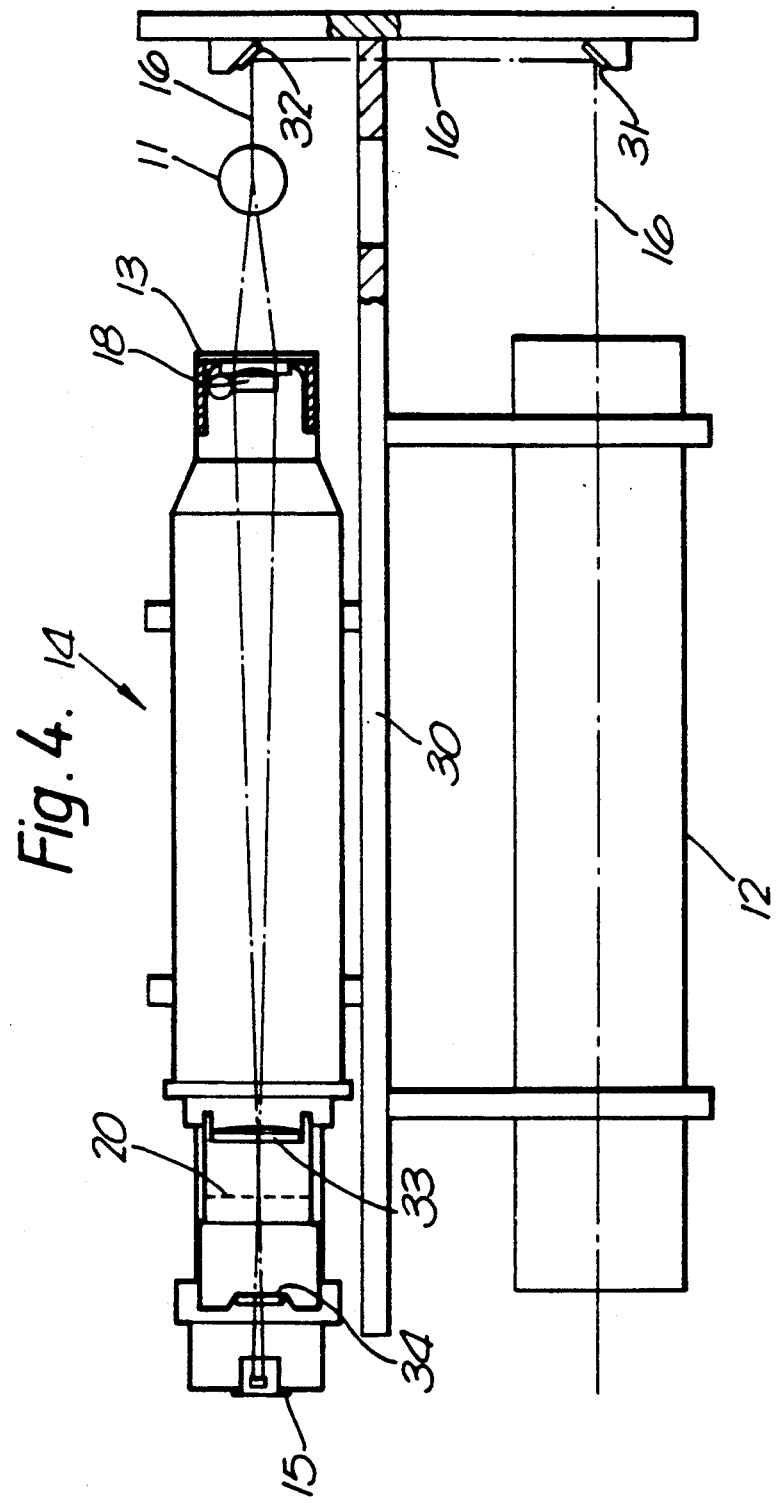
FIG. 4 is a schematic view of a second embodiment of the position sensor.

In FIG. 4, the second embodiment of the position sensor is shown. It has a similar form to the first embodiment, and similar items will be given similar references.

The position sensor of FIG. 4 comprises a mounting bracket 30 attached to the tool slide of the lathe. The mounting bracket supports the Helium-Neon laser 12, first and second turning mirrors 31, 32, each for deflecting the beam 16 emitted from the laser 12 through 90°, and the microscope 14. The microscope 14 mounts at its front end a knife edge 13 arranged, as in the previous embodiment, to block the beam 16 when it is undeviated. The microscope includes an ×5 objective lens system 18, an ×10 eyepiece lens system comprising a field lens 33 and an eye lens 34, a slit 20 located between the eye lens 34 and the field lens 33, and a photodiode 15 to measure the output.

As before, the mounting bracket is moved towards the arbour 11 while the output from photodiode 15 is monitored, and the data position is set at the longitudinal position corresponding to the sharply defined symmetrical peak shown in FIG. 2.

FIG. 5(a) shows the basic configuration of the third embodiment of the position sensor of the invention. A randomly polarized low power He—Ne laser 50 (approximately 1 mW) incident on the test piece (edge) 51 produces the edge diffraction imaged by an objective lens 52 through a slit 53 to an eyepiece 54 and a photodiode detector 55. The non-diffracted through beam is stopped by an opaque disc (beam stop) 56 or edge placed on the objective. The microscope view to the naked eye is shown in FIG. 5(b).

Laboratory tests have indicated that the optimum configuration of the elements is as shown in (b) of FIG. 5(a), where the laser and/or detector end are rotated about the test piece vertical axis to remove the need for a beam stop 56, thereby improving image resolution. In accordance with such an arrangement, input $\theta$ and output $\phi$ angles are limited by the surface optical quality, but the technique may be used for an angle up to 45° with minimal degradation of the output peak for aluminum and brass turned surfaces. Moreover, in the case of a knife-edge 51, these angles may be extended up to 90° (either $\theta$ or $\phi = 90°$).

A further gain in resolution will also result if the input beam is focused onto the edge 51 by focusing optics 57. This gain results from the definition of a smaller area on the edge 51 and a higher beam intensity. In addition, increasing the numerical aperture (NA) of the output objective improves the fringe (i.e., reduces electromagnetic interference) and hence position resolution. This results in a reduction in the width of the first bright maxima from approximately 12–15 $\mu$m to full resolution on the first fringe at approximately 1.5 $\mu$m. The invention of this embodiment has been tested for 'remote' range test distances of up to 8.23 meters by using a telescope in series with the microscope to provide the required resolution.

Figures 6A, 6B:
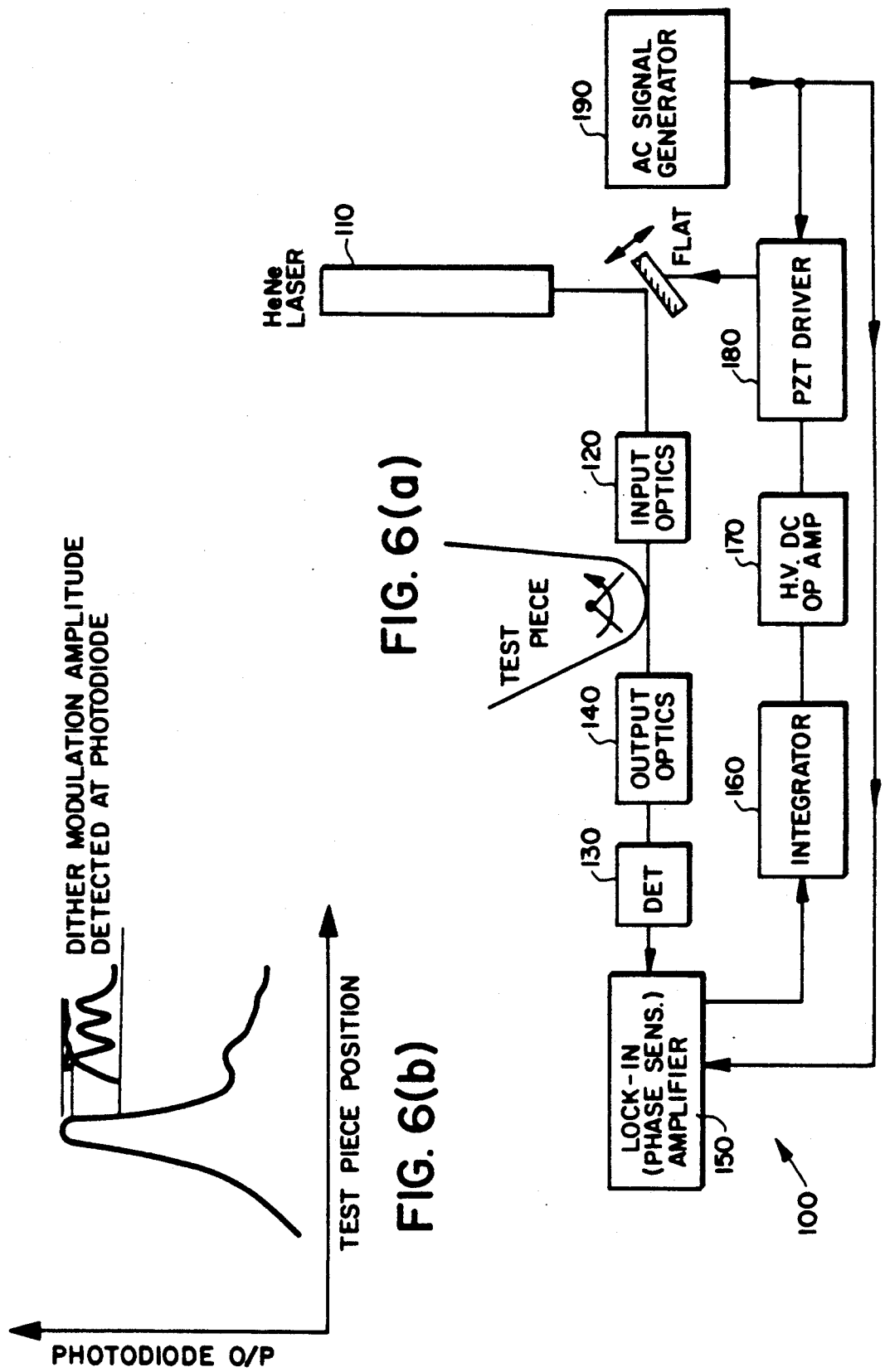
FIG. 6 shows a schematic view of a closed loop system for assessing the limiting performance of the technique of the invention of the third embodiment.

FIG. 6 shows a closed loop system 100 for assessing the limiting performance of the technique set forth above, and such a closed loop system may be used, for example, for diamond tool profile measurement tests. The He—Ne laser 110 output beam is dithered by the piezo controlled mirror (FLAT) so as to modulate the beam about the test piece edge. The beam then passes through an input objective 120 focused on the tool edge, and the diffraction intensity distribution is then relayed by output optics 140 to a photodiode detector 130 via a slit. The output of the detector is then fed into a phase sensitivity detector 150, the phase sensitivity detector 150 being referenced to the dither mirror frequency. The phase sensitive detector 150 locks onto the AC signal minimum output from AC signal generator 190 that occurs with a peak signal of the photodiode. Any deviations from this position result in error signals which are fed out to the integrator 160 which provides a DC offset signal with a set time constant to the high voltage DC operational amplifier 170. Amplifier 170 returns the mirror FLAT to the nominal position by providing a drive signal from piezoelectric (PZT) driver 180, thus completing the loop. The "error" signal from the integrator 160 is in this instance a measure of the tool position or surface profile if the tool were rotated about its mean radius of curvature. Of course, similar circuitry may be used for closed loop control, and other types of measurements may also be conducted.

Figure 7A:
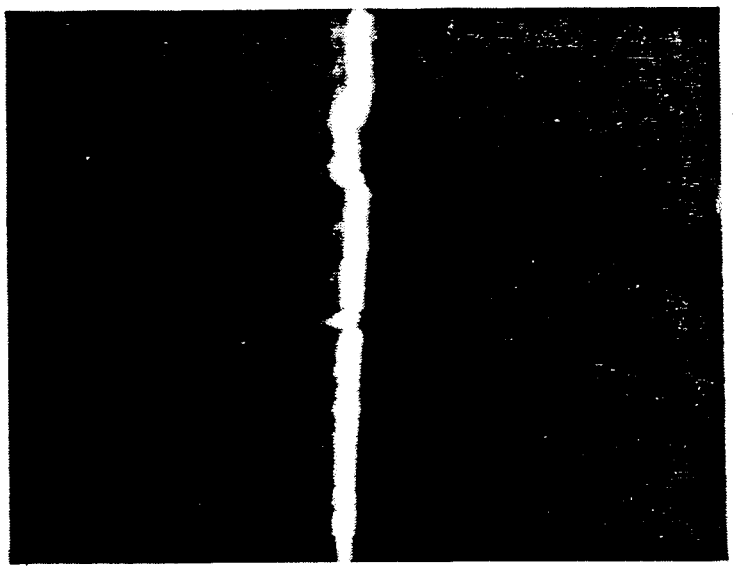
FIGS. 7(a)-7(c) and 8(a)-8(c) show photographs of the diffraction edge patterns for various test pieces taken by projecting the image from the microscope eyepiece onto a frosted glass screen placed some 700 mm distant.
Figure 7B:
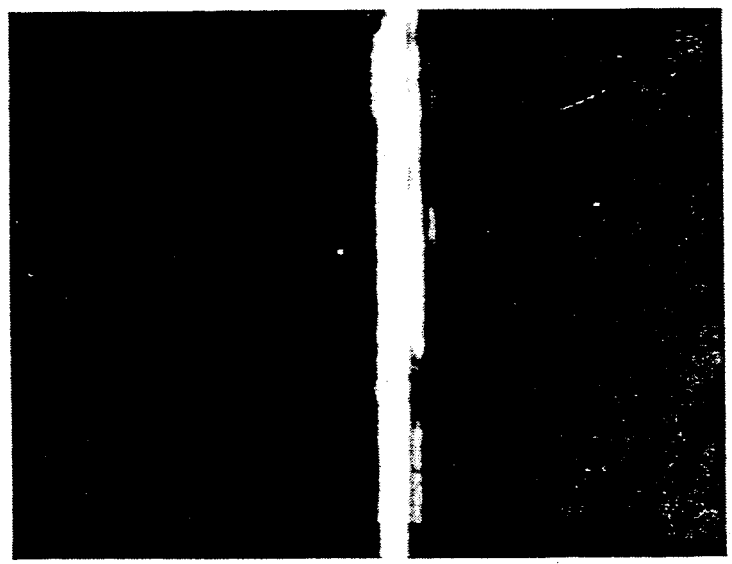
Figure 7C:
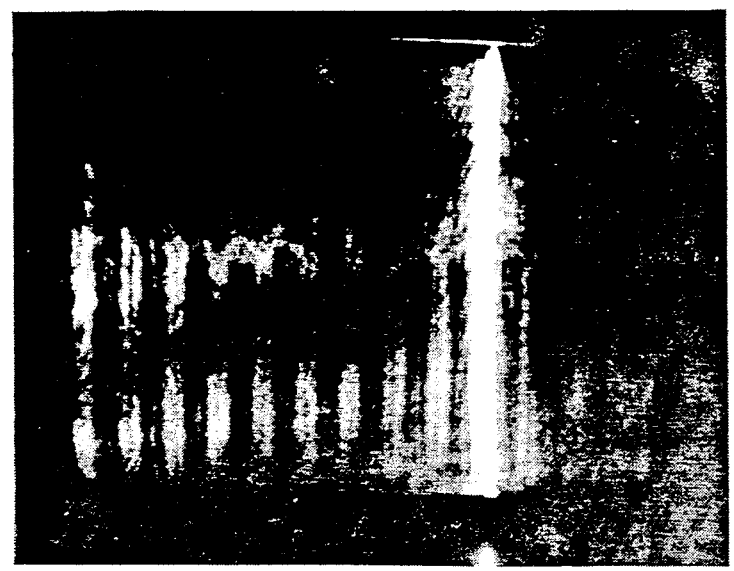
Figure 8A:
Figure 8B:
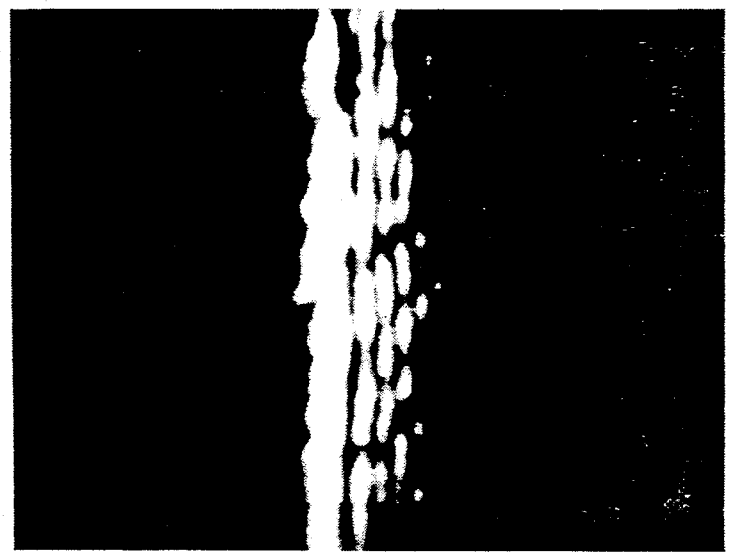
Figure 8C:

FIGS. 7 and 8 show photographs of the diffraction edge patterns for various test pieces taken by projecting the image from the microscope eyepiece 54 onto a frosted glass screen placed some 700 mm distance from the eyepiece. The test pieces are to the left of the pictures. The knife-edge pattern shows the symmetric intensity of the fringes about the maximum. It can be seen that increasing the test piece radius has the effect of introducing an asymmetry which apparently varies in proportion to the test piece radius.

In addition, the visual impression for the viewer is confirmed in the photographs. Namely, for laser illumination the bulk of the diffraction energy appears to be channeled into the first few fringes such that for a low resolution ×5 objective, the bright rim image is seen as a single bright fringe in the case of knife-edge test pieces.

The use of a very high power ×63 input objective does not improve the resolution, and instead, the optimum resolution may be obtained by working at an input angle of approximately 25° with an ×5 objective while using an ×10 (0.25 NA) objective to relay the image to the slit plane. This results in reduction of the full width half maximum (FWHM) to approximately 3–4 $\mu$m with a 25 $\mu$m slit while the use of a 5 $\mu$m slit on a diamond tool may produce the same result with an FWHM of approximately 1½ $\mu$m, i.e, on the order of the first fringe FWHM. In addition, for a given edge and optical system the slit size does not appear to have any marked effect on the output peak FWHM, although the radius of the test piece does.

Use of an input objective to define a smaller target area and to provide a beam on the order of NA to the output optics has been demonstrated to provide an improved resolution performance when matched to the output optics NA with an ×5 (0.12 NA) objective providing the most practical solution. In addition, an ×10 (0.25 NA) output objective has been found to be the best compromise between resolution and working distance (which is on the order of 7 mm) for the output optics, and in theory such an objective should provide a full resolution of the diffraction pattern around the first bright fringe.

This technique can also been extended with suitable optics to ranges on the order of meters. For a remote test a basic system consisting of a light collecting lens and a slit only at a distance of 1½ meters has been found to have a resolution $\leq \pm 5$ μm. In addition, an arrangement with a large collecting doublet and a microscope image magnifying system may also have a resolution $< \pm 5$ μm, but in addition, such a system shows a high degree of sensitivity to atmospheric turbulence in the beam path in front of the doublet. The output of this system when displayed on an oscilloscope shows the frequency components of the beam turbulence (mostly in the 10 Hz to 2 kHz range) when the beam is disturbed at various distances from the doublet. Accordingly, atmospheric noise input should be considered when using a sensor arrangement at these ranges in an open air environment.

Figure 9:
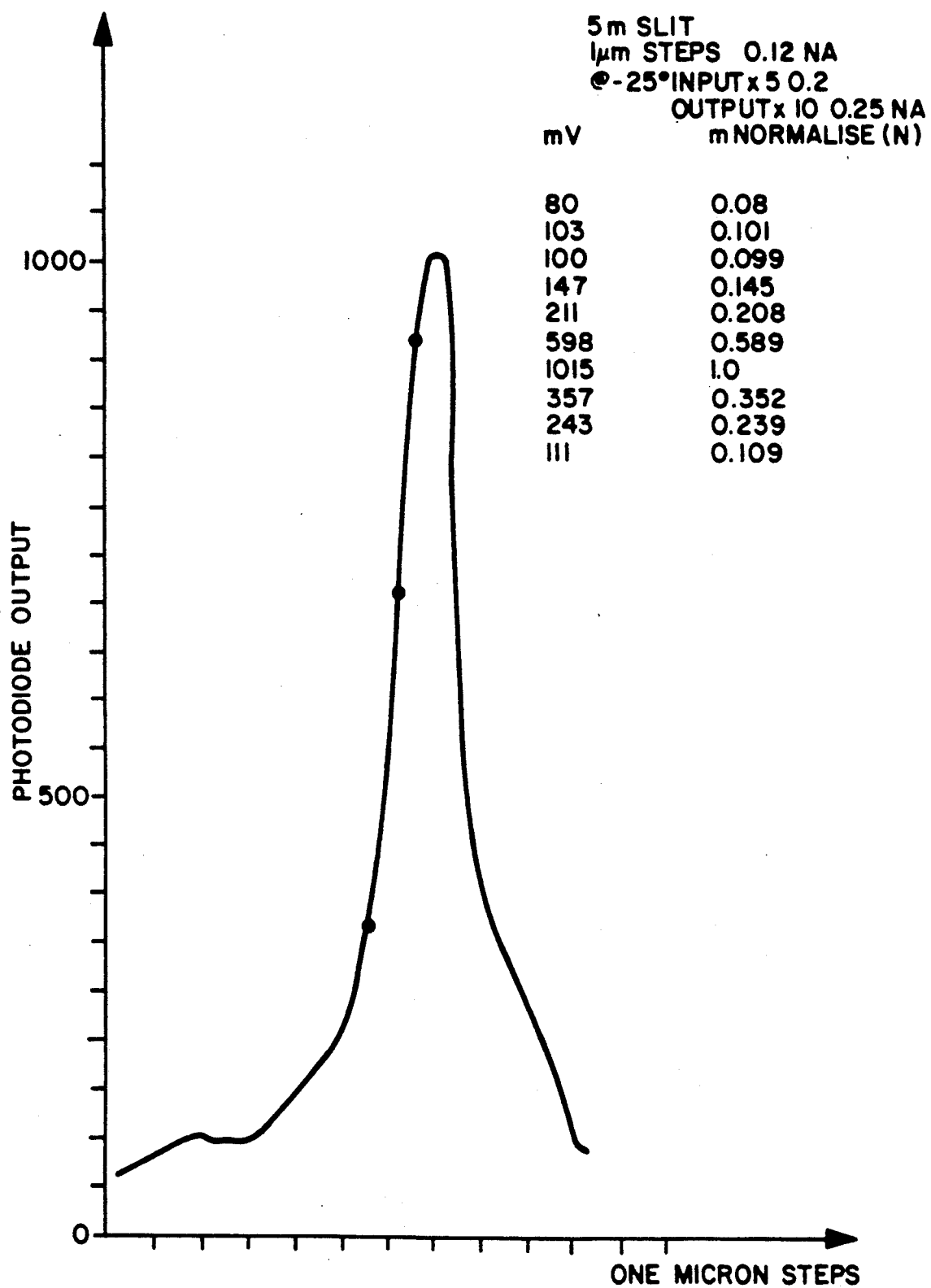
FIG. 9 shows the results of a test on a diamond tool having a radius of 1.524 mm whereby sub-micron resolution is possible.

Further tests carried out on a diamond tool of radius 1.524 mm have indicated that sub-micron resolution is possible and that a sensor using a knife-edge may be capable of locating and operating about the peak maximum, i.e., the modulation minimum, as shown in FIG. 9.

Figure 10A:
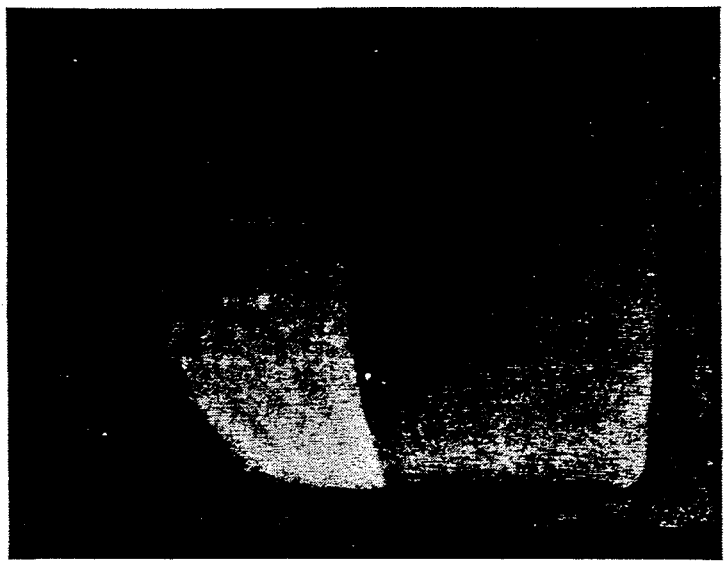
FIGS. 10(a)-(c) show photographs of a diamond machine tool edge for different light sources.
Figure 10B:
Figure 10C:
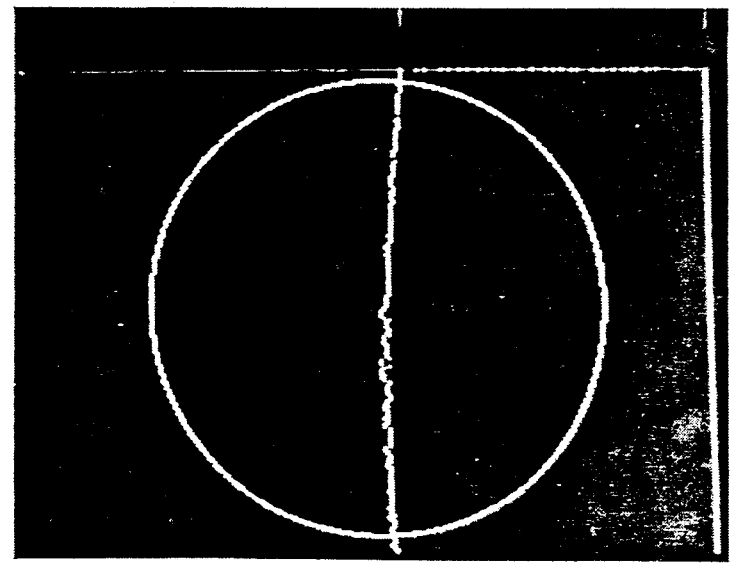

An additional application of the technique for diamond tool and edge profiling is generally suggested by the photographs of FIG. 10. FIG. 10 shows a diamond machine tool edge measured in accordance with the invention. FIG. 10(a) shows the diamond machine tool edge with incoherent (0.88 μm) illumination, where FIG. 10(b) shows illumination with the raw input of an He—Ne laser source. FIG. 10(c), on the other hand, shows a high power ×400 image processed profile made using an intellect software package. The combination of the edge sensing technique with such intellect image processing software can be used to provide rapid analysis of profile roughness and curvatures in accordance with the invention. In addition, the magnification of the ×400 view of FIG. 10(c) may be increased to provide details on the scale of λ.

The third embodiment of the invention described above may be mounted in an assembly similar to that described with respect to FIGS. 1 and 4. In addition, the third embodiment of the invention may be modified so as to employ a dual wavelength system such as a Krypton laser line pair at 676 nm and 647 nm such that the resulting diffraction pattern might be able to provide an edge line width $\Delta S \approx \sqrt{\lambda_1 - \lambda_2}$, where in this case $\Delta S$ is approximately equal to 20 nm. By using the intellect image processing software to obtain frame difference intensities for $\lambda_1$ and $\lambda_2$, the resolution might go some way towards the theoretical limit for the edge profile thickness.

Moire techniques may also be used in accordance with the present invention in conjunction with a two edge system, and the relative orientation of the edges may be obtainable from the resulting Moire fringes as well as the edge separation. The limits of these techniques are set by laser noise in the form of spurious fringe patterns from dust particles and edge artifacts. However, such a system results in rather low resolution.

Finally, a two-color edge variant may be applied to the present invention by using $\lambda = 633$ nm and $\lambda = 546$ nm beams incident on opposite sides of the test piece and focused to a common spot on the detector plane so that any movements in the test piece in the X-Y plane may show up by a color change at the detector (assuming a fixed vertical axis orientation). Such a technique can be applied to remotely measure test piece sizes and positions along two axes with a resolution approximately equal to the basic single λ technique described above.

The edge diffraction techniques discussed above are best suited to special applications that call for remote sensing and in particular those required to be carried out within optical media. However, it will be appreciated that the present invention may have numerous applications outside of the optical media. For example, a different radiation source such as X-rays may be used. The main advantage of this technique compared to the large number of commercial sensors and transducer systems capable of sub-micron operation is the cost. The basic system of the present invention is relatively inexpensive, and in addition, the availability of the laser diode source should reduce both cost and dimensions of the sensor units.

Although the invention has been described in connection with several sample embodiments, it should be understood that the invention is not limited to such embodiments. The invention is intended to cover all modifications and equivalents as may be included within the scope and spirit of the invention as defined by the appended claims.

What is claimed is:

1. An apparatus for detecting the presence of a surface or interface at a predetermined position within a sensing region, comprising:

illuminating means for directing a collimated beam of optical radiation along a sensing axis through said sensing region;

optical radiation detector means, aligned with said sensing axis and located on the side of said sensing region opposite said illuminating means, for detecting optical radiation from said illuminating means which has been deviated by a surface or interface at said predetermined position; and blocking means located between said sensing region and said optical radiation detector means for preventing optical radiation from reaching said optical radiation detector means when said beam is not deviated by said surface or interface so that the presence of said surface or interface at said predetermined position may be determined from the optical radiation detected by said optical radiation detector means.

2. An apparatus according to claim 1, wherein said illuminating means is a laser having a collimated beam approximately 2 mm wide.

3. An apparatus according to claim 1, wherein said optical radiation detector means comprises an objective lens forming an image of the sensing region at an image plane, a light detector, and an eyepiece for focusing the image at said image plane onto said light detector.

4. An apparatus according to claim 3, wherein said image plane has a slit for selecting a predetermined portion of said sensing region for examination.

5. An apparatus according to claim 1, wherein said blocking means comprises a knife edge.

6. An apparatus for detecting the presence of a vertex of a contact lens at a predetermined position in a sensing region of a contact lens lathe including an arbour having a convex surface for holding said contact lens, said apparatus comprising:
- illuminating means for directing a collimated beam of optical radiation along a sensing axis through said sensing region;
- optical radiation detector means, aligned with said sensing axis and located on the side of said sensing region opposite said illuminating means, for detecting optical radiation from said illuminating means which has been deviated by a vertex of said contact lens; and
- blocking means located between said sensing region and said optical radiation detector means for preventing optical radiation from reaching said optical radiation detector means when said beam is not deviated by said vertex of said contact lens so that the presence of said vertex of said contact lens at said predetermined position may be determined from the optical radiation detected by said optical radiation detector means.

7. An apparatus according to claim 6, wherein said optical radiation detector means outputs a signal representing the vertex position of the concave inner surface of said contact lens to said contact lens lathe so that an appropriate path for machining said contact lens may be determined.

8. An apparatus according to claim 6, further comprising a tool slide upon which said illuminating means, said optical radiation detector means and said blocking means are mounted.

9. An apparatus according to claim 8, wherein said tool slide is movable backward and forward with respect to said arbour holding said contact lens, the tool slide being moved towards said arbour along an axis through said vertex so that the optical radiation detected by said optical radiation detector means for each position along said axis may be monitored.

10. An apparatus according to claim 6, wherein said blocking means comprises a knife edge.

11. A method of detecting the presence of a surface or interface at a predetermined position within a sensing region, comprising the steps of:
- generating a collimated beam of optical radiation;
- directing said collimated beam of optical radiation along a sensing axis through said sensing region so as to be deviated by a surface or interface at said predetermined position;
- detecting said optical radiation which has been deviated by said surface or interface at said predetermined position;
- preventing optical radiation from being detected which has not been deviated from said sensing axis by said surface or interface at said predetermined position; and
- determining the presence of the surface or interface at said predetermined position from the detected optical radiation which has been deviated from said sensing axis.

12. A method as in claim 11, wherein said detecting step comprises the steps of forming an image of the sensing region at an image plane and focusing the image at said image plane onto a light detector.

13. A method as in claim 11, comprising the further step of determining the position of said surface or interface by identifying the position within said sensing region at which a maximum intensity of said optical radiation is detected.

14. A method of claim 11, comprising the further step of determining the position of said surface or interface by taking the mean position of two points of equal intensity on either side of a position at which a maximum intensity of said optical radiation is detected.

15. A method of detecting the presence of a vertex of a contact lens at a predetermined position in a sensing region of a contact lens lathe including an arbour having a convex surface for holding said contact lens, comprising the steps of:
- generating a collimated beam of optical radiation;
- directing said collimated beam of optical radiation along a sensing axis through said sensing region so as to be deviated by said contact lens;
- detecting said optical radiation which has been deviated by said contact lens;
- preventing optical radiation from being detected which has not been deviated from said sensing axis by a vertex of said contact lens; and
- determining the presence of the vertex of said contact lens at said predetermined position from the detected optical radiation which has been deviated from said sensing axis.

16. A method as in claim 15, comprising the further steps of:
- disposing means for generating and directing said collimated beam of optical radiation, means for detecting said optical radiation and means for preventing the optical radiation from being detected on a tool slide movable with respect to said arbour; and
- determining the position of the vertex by adjusting the position of the arbour so as to obtain a maximum intensity of said detected optical radiation and marking the corresponding longitudinal position of said tool slide with respect to said arbour.

17. A method as in claim 15, comprising the further steps of:
- disposing means for generating and directing said collimated beam of optical radiation, means for detecting said optical radiation and means for preventing the optical radiation from being detected on a tool slide movable with respect to said arbour;
- moving said tool slide towards said arbour along an axis through said vertex;
- monitoring the optical radiation detected for each position along said axis; and
- recording the longitudinal position of said tool slide in relation to the intensity of said detected optical radiation as the tool slide is moved towards said arbour.

18. A method as in claim 17, comprising the further step of determining the position of said vertex of said contact lens by identifying the position within said sensing region at which a maximum intensity of said optical radiation is detected.

19. A method as in claim 17, comprising the further step of determining the position of said vertex of said contact lens by taking the mean position of two points of equal intensity on either side of a position at which a maximum intensity of said optical radiation is detected.

20. A method as in claim 16, comprising the further step of outputting a signal representing the vertex position of said contact lens to said contact lens lathe for determining an appropriate path for machining said contact lens.

21. A method as in claim 18, comprising the further step of outputting a signal representing the vertex position of said contact lens to said contact lens lathe for determining an appropriate path for machining said contact lens.

22. A method as in claim 19, comprising the further step of outputting a signal representing the vertex position of said contact lens to said contact lens lathe for determining an appropriate path for machining said contact lens.

23. Apparatus for detecting the presence of a surface or interface at a predetermined position within a sensing region, comprising:

illuminating means for directing radiation along a sensing axis through said sensing region;

radiation detector means, aligned with said sensing axis and located on the side of said sensing region opposite said illuminating means, for detecting radiation from said illuminating means which has been deviated by a surface or interface at said predetermined position; and blocking means located between said sensing region and said optical radiation detector means for preventing radiation from reaching said radiation detector means when said radiation is not deviated by said surface or interface so that the presence of said surface or interface at said predetermined position may be determined from the radiation detected by said radiation detector means.

24. A method of detecting the presence of a surface or interface at a predetermined position within a sensing region, comprising the steps of:

generating a beam of radiation;

directing said beam of radiation along a sensing axis through said sensing region so as to be deviated by a surface or interface at said predetermined position;

detecting said radiation which has been deviated by said surface or interface at said predetermined position;

preventing radiation from being detected which has not been deviated from said sensing axis by said surface or interface at said predetermined position; and determining the presence of the surface or interface at said predetermined position from the detected radiation which has been deviated from said sensing axis.

25. A method as in claim 24, wherein said detecting step comprises the steps of forming an image of the sensing region at an image plane and focusing the image at said image plane onto a detector.

26. A method as in claim 24, comprising the further step of determining the position of said surface or interface by identifying the position within said sensing region at which a maximum intensity of said radiation is detected.

27. A method as in claim 24, comprising the further step of determining the position of said surface or interface by taking the mean position of two points of equal intensity on either side of a position at which a maximum intensity of said radiation is detected.

28. A method of detecting the position of an object within a sensing region, comprising the steps of:

generating a beam of radiation;

directing said beam of radiation along a sensing axis through said sensing region so as to contact said object at a predetermined angle to the vertical axis of the object;

detecting through a slit radiation which has been deviated from said sensing axis by said object;

determining the position of said object by identifying a position at which a maximum intensity of said radiation is detected.

29. A method as in claim 28, comprising the further steps of focusing said beam onto an edge of said object and detecting radiation deviated by said edge.

30. A method as in claim 28, comprising the further steps of forming an image of the sensing region at an image plane and focusing the image at said image plane through said slit onto a detector.

31. A method as in claim 28, wherein said position determining step comprises the step of taking the mean position of two points of equal intensity of either side of a position at which a maximum intensity of said radiation is detected.

32. A method as in claim 28, comprising the further steps of dithering said beam of radiation so as to modulate said beam of radiation about an edge of said object and locking onto a signal which occurs when the position at which a maximum intensity of said radiation is detected.

33. Apparatus for detecting the position of an object within a sensing region, comprising:

means for directing radiation along a sensing axis through said sensing region so as to irradiate said object at a predetermined angle to the vertical axis of the object;

radiation detector means for detecting through a slit radiation which has been deviated from said sensing axis by said object; and means for determining the position of said object by identifying a position at which a maximum intensity of said radiation is detected by said radiation detector means.

34. Apparatus as in claim 33, wherein said radiation detector means comprises an objective lens for focusing said radiation through said slit to an eyepiece, which then focuses the diffracted radiation onto a photodiode detector.

35. Apparatus as in claim 33, wherein said predetermined angle is less than or equal to 45° when said object has a surface of one of brass and aluminum.

36. Apparatus as in claim 33, wherein said predetermined angle is less than or equal to 90° when said object has a knife-edge.

37. Apparatus as in claim 33, further comprising focusing means for focusing said radiation from said directing means onto an edge of said object, radiation deviated by said edge being detected by said radiation detector means.

38. Apparatus as in claim 33, wherein said directing means comprises a laser radiation source for outputting said radiation along said sensing axis, and said radiation detector means comprises said slit, a lens for directing said radiation through said slit, and a photodetector for detecting radiation which passes through said slit.

39. Apparatus as in claim 38, wherein said lens is a collimating lens.

40. Apparatus as in claim 33, wherein said radiation detector means comprises an alignment telescope with a microscope for enlarging an image represented by the deviated radiation and a photodetector upon which said image is focused.

41. Apparatus as in claim 33, further comprising:
dithering means for dithering said radiation about an edge of said object; and
loop control means for controlling said dithering means so as to maintain the output of said radiation detector means at said maximum intensity.

42. Apparatus as in claim 41, wherein said loop control means comprises:
an alternating current signal generator for generating an alternating current signal;
phase sensitivity detection means referenced to a dither frequency of said dithering means for detecting a peak in the output of said radiation detector means and for locking onto a minimum value of said alternating current signal when a peak is detected; and
feedback means for feeding back an error signal when the detected output of said radiation detector means varies from said peak and for controlling said dithering means so as to compensate said error signal.

43. Apparatus for detecting the presence of a surface or interface at a predetermined position within a sensing region, comprising:
illuminating means for directing radiation along a sensing axis through said sensing region;
radiation detector means for detecting radiation from said illuminating means which has been deviated by a surface or interface at said predetermined position; and
means for preventing radiation from reaching said radiation detector means when said radiation is not deviated by said surface or interface so that the presence of said surface or interface at said predetermined position may be determined from the radiation detected by said radiation detector means.

44. A method of detecting the presence of a surface or interface at a predetermined position within a sensing region, comprising the steps of:
directing radiation along a sensing axis through said sensing region;
detecting radiation which has been deviated by a surface or interface at said predetermined position;
preventing radiation from being detected which has not been deviated from said sensing axis by said surface or interface at said predetermined position; and
determining the presence of the surface or interface at said predetermined position from the detected radiation which has been deviated from said sensing axis.

45. In a method for shaping the front end of a contact lens blank to provide it with a convex surface, the lens blank having a concave dished rear surface which includes
engaging the lens blank front end with a shaping tool to remove material therefrom in a course following the intended convex surface when one is rotated relative to the other, the steps of
holding the lens blank with the dished surface thereof so positioned that the base curve thereof is disposed substantially symmetrically of a fixed axis,
projecting a light beam in a path perpendicular to said fixed axis, the lens blank being held so as to locate the front end thereof adjacent said light beam,
effecting orthogonal relative movement between the light beam path and the held position of the lens blank therewith to cause the light beam to pass through the lens blank until at least a portion of the light beam impinges on the base curve at a point which is essentially coincident with the vertex, at which point the light beam undergoes a recordable deflection,
recording the occurrence of the light beam deflection, and
employing the recorded occurrence to control the duration of engagement of the lens blank with the shaping tool thereby to produce a contact lens of desired center thickness.

46. The method of claim 45 in which the relative orthogonal movement between the light beam and the held position of the lens blank is effected by maintaining the light beam stationary and moving the lens blank along the fixed axis in the direction of the light beam.

47. The method of claim 45 in which the light beam is a laser light beam.

48. The method of claim 47 in which the laser is a helium-neon laser.

49. The method of claim 45 in which engagement of the lens blank front end with the shaping tool is effected by holding one and moving the other into contact therewith.

50. A method for detecting the vertex of the base curve of a concave dished surface formed in a transparent article which comprises
projecting a light beam along a beam path,
holding the article in a position in which the concave surface thereof is disposed substantially symmetrically of an axis extending perpendicular to the beam path,
effecting orthogonal relative movement between said beam path and the held position of said article so that the light beam passes through the article until at least a portion of the light beam impinges on the base curve at a point which is essentially coincident with the vertex, at which point the light beam undergoes a recordable deflection, and
recording the occurrence of the light beam deflection.

51. Apparatus for detecting the vertex of the base curve of a concave dished surface formed in a transparent article which comprises
means for projecting a light beam along a beam path,
means for holding the article in a position in which the concave surface thereof is disposed substantially symmetrically of an axis extending perpendicular to the beam path.
means for effecting orthogonal relative movement between said beam path and the held position of said article so that the light beam can be passed through the article until at least a portion of the light beam impinges on the base curve at a point which is essentially coincident with the vertex, at which point the light beam undergoes a recordable deflection, and
recorder means situate in the path of the deflected light beam to record such deflection occurrence.

52. The apparatus of claim 51 in which the recorder means is operable to record the presence of the deflected light beam as an electrical signal.

53. The apparatus of claim 51 in which the light beam projecting means comprises a laser.

54. The apparatus of claim 53 in which the laser is a helium-neon laser.

55. The apparatus of claim 52 in which the recorder means is a photo diode.

56. In an apparatus for shaping the front end of a contact lens blank to provide it with a convex surface, the lens blank having a concave dished rear surface, the apparatus including
- a shaping tool with which the lens blank front end can be engaged to remove material therefrom in a course following the intended convex surface when one is rotated relative to the other,
- a holder for holding the lens blank with the dished surface thereof so positioned that the base curve thereof is disposed substantially symmetrically of a fixed axis,
- a light source supported for projecting a light beam in a path extending perpendicular to the fixed axis, the holder holding the blank adjacent the light beam path,
- means for effecting orthogonal relative movement between the light beam path and the holder therewith to cause the light beam to pass through the lens blank until at least a portion of the light beam impinges on the base curve at a point which is essentially coincident with the vertex, at which point the light beam undergoes a recordable deflection, and
- recorder means situate in the path of the deflected light beam to record such deflection occurrence and operable to generate a signal for controlling the duration of engagement of the lens blank and shaping tool when the two are thereafter brought into engagement to produce a contact lens of desired center thickness.

* * * * *